United States Patent [19]

Hoerner et al.

[11] Patent Number: 4,824,506

[45] Date of Patent: Apr. 25, 1989

[54] PROCESS FOR PROTECTING THERMOFORMED FILMS

[75] Inventors: Rebecca S. Hoerner, Grosse Point Woods; William T. Short, Southfield, both of Mich.

[73] Assignee: General Motors Corporation, Detroit, Mich.

[21] Appl. No.: 184,216

[22] Filed: Apr. 21, 1988

[51] Int. Cl.$^4$ .................. B29C 43/56; B32B 31/20
[52] U.S. Cl. .................. 156/245; 156/247; 156/285; 156/306.3; 156/323; 156/344; 427/154
[58] Field of Search .............. 156/230, 241, 245, 247, 156/285, 306.3, 323, 344; 264/511, 522, 544, 553; 427/154, 155, 156

[56] References Cited

U.S. PATENT DOCUMENTS

| | | | |
|---|---|---|---|
| 2,020,256 | 11/1935 | Copeman | 156/344 |
| 2,654,687 | 10/1953 | Fridolph | 156/241 |
| 2,932,252 | 1/1976 | Woods | 156/245 |
| 3,434,904 | 11/1969 | Wiggins | 156/306.3 |
| 3,491,039 | 1/1970 | Takahashi et al. | 524/391 |
| 3,562,059 | 2/1971 | Gladen | 156/323 |
| 4,477,504 | 10/1984 | Bailey et al. | 428/138 |
| 4,623,413 | 11/1986 | Questel et al. | 156/247 |

*Primary Examiner*—Caleb Weston
*Attorney, Agent, or Firm*—Randy W. Tung

[57] ABSTRACT

A process for thermoforming a decorative glossy film to a relatively rigid substrate includes the steps of: providing a carrier film having a heat absorption limit or a plurality of heat absorption limits above which decorative degradation occurs during direct exposure to heat sources of thermoforming apparatus; thermally protecting the surface of the carrier film with a layer of material with a heat absorption rate which will shield the carrier film against excessive heat buildup while softening the carrier film for drawing against a substrate; drawing the carrier film and the protective layer thereon into bonded engagement with the relatively rigid substrate; and thereafter removing the thermal protection layer without degrading the appearance of the decorative carrier film.

18 Claims, 2 Drawing Sheets

PROCESS FOR PROTECTING THERMOFORMED FILMS

FIELD OF THE INVENTION

This invention relates to thermoforming processes and more particularly to thermoforming processes for drawing a decorative, heat sensitive carrier film against a relatively rigid substrate.

BACKGROUND OF THE INVENTION

It is known to provide a protective coating on a substrate to protect the substrate during processing, or handling or shipping. Such protective coatings are used on a variety of substrate materials. In many instances, the protective coatings can be stripped from the underlying substrate material without affecting the surface characteristics of the underlying material.

An example of one such material is setforth in U.S. Pat. No. 3,491,039 wherein the coating is suggested for use in protecting a variety of products and materials including materials having decorative features thereon. While suitable for its intended purpose, there is no suggestion of utilizing the coating in a thermoforming process which will protect either thermally sensitive carrier films or thermally sensitive decorative features on such carrier film.

It is also known to provide a protective coating on wall cover and headliner materials for use in motor vehicles. The protective coating is applied to such materials as they are being processed and handled by employees in a plant environment. Such protective coatings are known to include a film which is laminated on a part by thermoforming. In such case the protective coating is formed from a material which will stretch and withstand deep drawing against the substrate material. An example of such prior art is U.S. Pat. No. 4,623,413 which discloses a protective film of unoriented polypropylene.

It is also known to provide a protective coating on relatively rigid components of a vehicle such as is shown in U.S. Pat. No. 4,477,504 wherein a polymer film is vacuum formed to cover a instrument panel insert during its processing to form a cellular foam product.

The aforesaid methods do not disclose a process to protect a thermaly limited carrier film during thermoforming thereof against a relatively rigid substrate. In particular, the known processes or methods fail to disclose steps for solving the problem of thermal degradation of heat sensitive carrier films and/or heat sensitive decorative features thereon.

SUMMARY OF THE INVENTION

In brief, this process involves painting a polymeric support or carrier film with one or more layers of paint (color/clear coats), optionally backing the film with an adhesive or adhesion promoter, and incorporating this laminate into the exposed surface of a body panel. This is frequently accomplished by radiantly heating the carrier film laminate in a specially modified vacuum forming operation and stretch forming it over an existing part.

In the case of certain thermoformable carrier films, the carrier has a glossy surface which can be dulled during heating of the carrier film prior to thermoforming against a relatively rigid substrate.

In other cases, the carrier film may include two tone decorative paint regions thereon. In such cases, a region of one color may absorb more heat than another region. In some cases heat transfer to the film required for thermoforming can depend dramatically on the heat absorption characteristics (color) of the different paint layers comprising the two tone or multiple tone decorative aspect. The heat absorption differential caused by color differences is especially critical in the case of thin carrier films having a rapid heat loss because of high surface area to film thickness ratios.

For example, in the case of a part having a black color coated region and a similar metal flake coated region, the heat absorption rate can be so great that the "black body" portion of the part will absorb heat and be thermally degraded while the heat reflective silver flake region is being heated to a temperature at which the whole film area can be thermoformed against a relatively rigid substrate.

Adjustment of the heater output to accommodate such two tone variances can cause the carrier film to lose all or part of its surface gloss.

The problem is made even more complex when a process must be designed to accommodate a full range of complementary colors on such carrier films.

The process cycles to accomplish thermoforming of a carrier film may employ dozens of individual thermoforming cycles dependent upon the color combinations in the decorative features of the carrier film. In some cases, such thermoforming cycles may be dramatically longer than others (e.g., white, light metallic and clear films require longer cycles than black and dark paint colors).

It is difficut to control thermoforming apparatus to provide for such variances in cycle time. An exemplar is the large number of colors and color combinations used in automotive trim applications. Each color or combination requires resetting the heating pattern of the thermoforming apparatus to assure that areas of different color reach the molding temperature together. Such continuous resetting of heat patterns is not practical under mass production conditions.

Consequently, the heat source in such apparatus may cause variations in the surface gloss of the resultant product. In some cases, the color can be degraded because of locally high surface temperatures produced by color dependent variations in heat absorption. Also, with multicolored two tone regions, or patterned laminates such differential heat absorption can cause distortion of the film itself and thus make reproducible thermoforming of the carrier film onto a substrate difficult, if not impossible.

SUMMARY OF THE INVENTION

An object of the present invention is to provide a robust, reliable and repeatable process for thermoforming decorative carrier films against a relatively rigid substrate in which heat absorption to the carrier film is controlled by a thermal heat sink interposed between thermoforming heaters and the decorative aspects of the carrier film to prevent heat absorption which exceeds the thermal degradation limits of the carrier film itself or the decorative features thereon.

Yet another object of the present invention is to provide such a process wherein the thermoforming heat output is attenuated so as to eliminate differential heat absorption by two tone color layers on the carrier film.

Yet another object of the present invention is to provide such a process wherein the heat sink is in the form of a protective layer to prevent oxidation or other degradation of the carrier film surface during heating and forming so as to repeatably produce uniform parts with superior uniformity of gloss, formability and color.

A feature of the present invention is to cover the carrier film wih a protective coating which is opaque and is elastic or at least thermoformable with the protected carrier film and to provide a coating composition which is peelable from the carrier film by stripping or washing.

Yet another feature is to improve a process for molding a thermally sensitive carrier film to a relatively rigid substrate by use of thermoforming apparatus including a heat source, which process includes the steps of: selecting a carrier film having a decorative feature therein which is thermally stable below a predetermined temperature limit and which is thermoformable at temperatures below the predetermined temperature limit; coating the carrier film with a protective material having heat absorption characteristics which will preferentially heat the carrier film to be thermally formable without reaching the predetermined temperature limit; and which is thermoformable at temperatures below the predetermined temperature limit; coating the carrier film with a protective material having heat absorption characteristics which will preferentially heat the carrier film to be thermally formable without reaching the predetermined temperature level; and exposing the protective coating to the heat source and attenuating heat flow from the heat source in the protective coating to control the temperature in the carrier film below the temperature limit and above the thermoforming temperature.

A further feature is to process the carrier film by use of a protective coating of opaque, elastic material to form a thermoformed part including a substrate, a carrier film and a protective coating which may remain intact until the part reaches a point of final assembly or use.

Yet another feature is to provide such an improved process wherein the coated carrier film is disposed below a heat lamp and heated thereby until the carrier film softens; and thereafter drawing the carrier film and the protective coating thereon against the relatively rigid substrate by imposing a pressure differential across the coated carrier film once it is heated to its thermoforming temperature and terminating the input of heat into the coated carrier film before the temperature of the carrier film excess the thermal limit of the decorative features thereof.

Yet another feature is to provide such a process by selecting a carrier film from polymeric material having first and second colors.

Still another feature is to provide such a process which includes selecting the protective coating from material which absorbs heat to prevent significant differential absorption of heat by the different colors in the carrier film.

Yet another object of the present invention is to select the carrier film from polymeric materials including polyesters, polyethers, polyvinyl clorides, polypropylene, polyamides, polyurethanes, polyolefins and other heat formable polymers including blends and alloys.

Still another object is to select a carrier film having a glossy surface as its decorative feature; and to cover the carrier film with a thermal barrier which shields the glossy surface from oxidation as the carrier film is heated by the heat source; and absorbing heat in the thermal barrier to prevent thermal degradation of the glossy surface while softening the carrier film for thermoforming against the relatively rigid substrate.

Other objects, features and advantages of the present invention will be readily appreciated as they become better understood with reference to the following description when considered in conjunction with the accompanying drawings wherein:

DETAILED DESCRIPTION OF PREFERRED EMBODIMENTS

Figure 1:
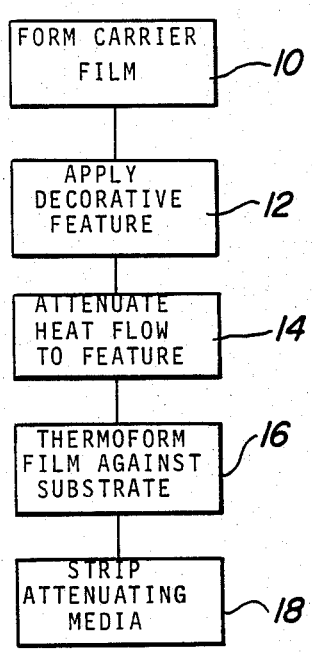
FIG. 1 is a chart showing the process steps of the present invention.

Referring now to FIG. 1, the process includes the step of forming 10 a thermoformable carrier film from a family of thin polymers including the exemplary materials such as thermoplastic polyurethanes, polyesters, vinylcopolymers, polyvinylchloride and blends, copolymers and alloys thereof.

The materials can have a thickness in the range of 2 to 20 mils for easy forming at temperatures of 25° C. to 190° .C; the preferred thickness range is 5 to 10 mils thermoformable from 110° C. to 150° C. The thermoforming apparatus has a heater for directly heating the carrier film and a system for applying a differential pressure across the film to draw it against a relatively rigid substrate.

The second step of the process is to apply 12 a decorative feature in the carrier film and determine its thermal degradation limit. For example, the carrier film may be polyester of a thickness of 7 mils covered by a one mil polyether elastomeric color coat and a 1.5 mil elastomeric polyurethane clear coat. Alternatively, the carrier film may be painted to have a two tone appearance of complementary colors. Alternatively, the carrier film may have a pattern formed thereon by silk screening or other pattern forming process, i.e., mask/spray paint and the like.

For example, as shown in FIGS. 2A-2D, a base layer 29 of a decorative carrier film 30 of the aforedescribed type can be painted to have first and second color zones 32, 34 thereon of light blue and dark blue. The two tone carrier film is used to cover a substrate such as a formed metal panel 36 (FIGS. 3A-3C) such as a door panel for a vehicle.

In brief, this process involves painting a polymeric support or carrier film with one or more layers of paint (color/clear coats), optionally backing the film with an adhesive or adhesion promoter, and incorporating this laminate into the exposed surface of a body panel. This is frequently accomplished by radiantly heating the carrier film laminate in a specially modified vacuum forming operation and stretch forming it over an existing part.

Figure 2A:
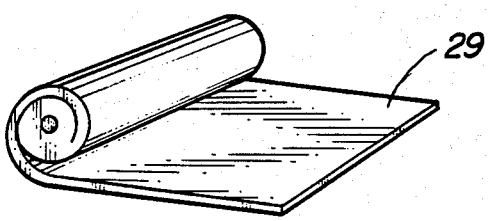
FIGS. 2A-2D are diagrammatic perspective views of a carrier film and protective coating used in the process of the present invention.
Figure 2B:
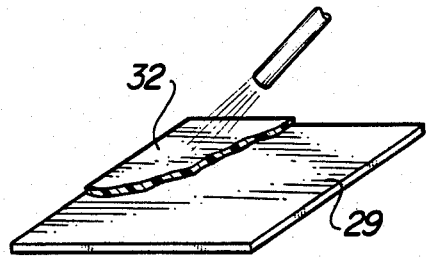
Figure 2C:
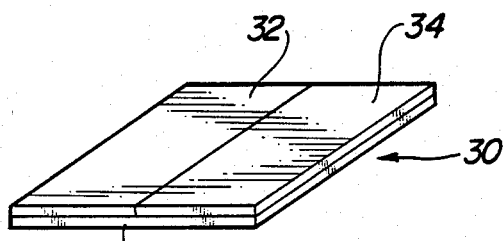
Figure 2D:
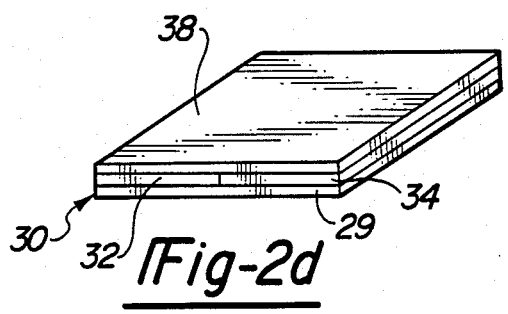
Figure 3A:
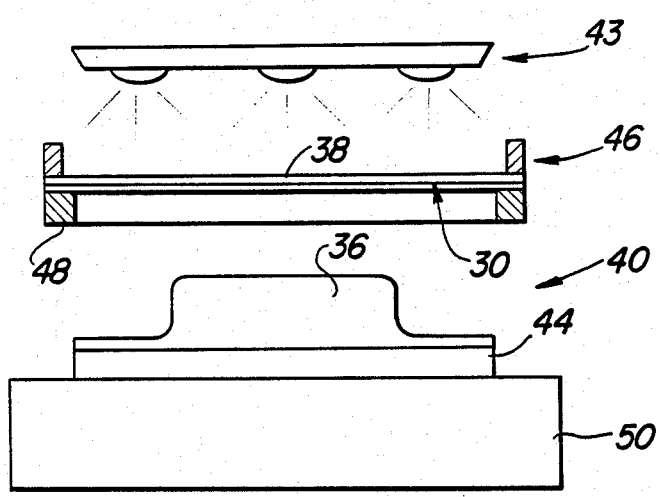
FIGS. 3A-3C are diagrammatic views of the thermoforming process.

In practicing the invention, the color zones can be applied as separate paint layers by spraying, brush or roll coating, or screen printing as shown in FIGS. 2B and 2C. The carrier film 30 shown in FIG. 2D is aligned with the metal panel 36 in thermoforming apparatus 40.

The apparatus 40 includes radiant heaters 43, a vacuum buck 44 and a frame 46 with a gasket 48 to seal the periphery 49 of the vacuum buck 44 on a vacuum form table 50.

According to the thermoforming process, which is representatively shown, the frame 46 positions the decorative carrier film 30 over the panel 36 as soon as the heaters 42 soften the material of the carrier film 30.

The thermoforming process includes the inventive step of the process to attenuate 14 a heat source by interposing a heat sink 38 between the thermoforming heat source (heaters 43) and the decorative carrier film 30 to attenuate at least a part of the heat input thereto to control temperatures in the decorative features below their thermal degradation limits.

Figure 3B:
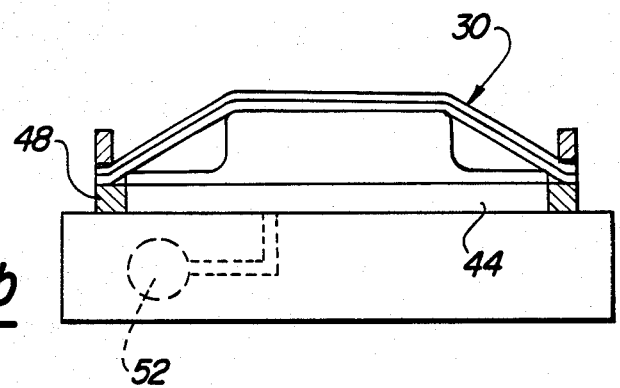
Figure 3C:
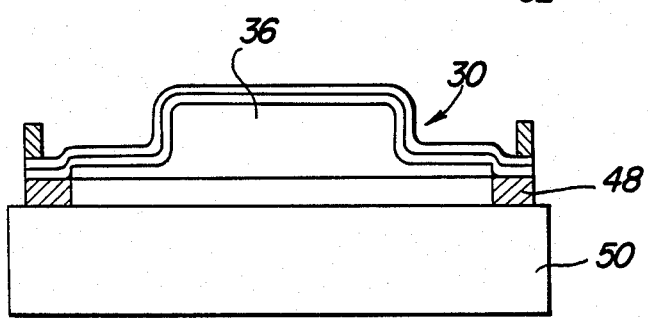

Once the carrier film 30 is sufficiently softened, the frame 46 positions the decorative carrier film 30 to be draped as shown in FIG. 3B. Gasket 48 seals the periphery 49 of the buck and a vacuum source 52 is operated to produce a pressure differential across the decorative carrier film 30.

The carrier film 30 is thermoformed 16 and drawn against the panel (FIG. 3C) and the heat sink 38 prevents the decorative features from changing appearance either as to gloss, color or physical form/dimension.

In one embodiment of the invention, the heat sink 38 is any strippable thermal protective coating (FIG. 2D). In coating form, the heat sink 38 is preferably opaque and it is as formable as the underlying carrier film.

Figure 4:
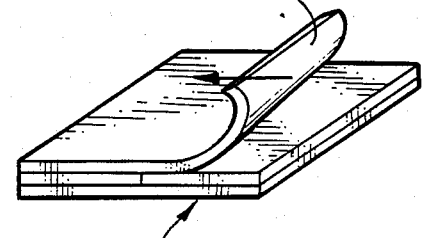
FIG. 4 is a diagrammatic view of a final stripping step to expose a finished surface on the thermoformed part.

The process includes a removal step 20 in which the protective coating is either stripped 22 or washed 24 from the decorative carrier film 30 as shown in FIG. 4.

When the heat sink 38 is in the form of a peelable coating, it is either stripped or washed from the carrier film after the moldable coating laminate has been bonded to it. With proper choice of materials, it would even be possible to retain the thermal coat heat sink until just before assembly, in which case it could also serve as a protective coating, without need of a separate operation, and the associated costs that are usually accrued. While the benefits of this process are discussed with respect to automotive applications, they are applicable to any other application in which it is desirable to thermoform a carrier film onto a substrate.

Potentially many types of coatings or waxes could be used as the peel coat. They must possess certain qualities, however, that allow them to remain a coherent part of the painted laminate until after the heat cycle of the forming process. Typical examples include the following:

EXAMPLE 1

A 10 mil amorphous polyester film was coated with about 1 mil of a black gloss flexible automotive topcoat (20 degree gloss ca 80). The painted film was then placed in a frame and heated with radiant quartz resistance heaters (12 micron) to a film temperature of 335° F. The film was drawn into vacuum box and onto a rigid rim panel when the temperature had fallen to 325° F. Upon removal from the mold the coating was very dull, (20° gloss 10) was in the lower regions of the instrumental measurement capabilities of a 20 Gloss Meter of the type sold by Hunter Associate Laboratory Inc. of Reston, Va., and well below acceptable automotive standards for a gloss application.

A second sample of the black topcoated laminate was formed in an identical manner except that the painted laminate was also given about a 5–10 mil coating of a white, strippable paint (in this case booth coat 8500 from the Dover Chemical Corporation of Midlothian, IL) prior to the molding step. When the protective coating was peeled from the formed panel, the gloss of this coating was virtually the same as the initial value.

EXAMPLE 2

Two portions of a 7 mil polyester carrier film were coated with 1 mil of either a solid black color coat or a silver metallic color coat. Both were standard flexible automotive-type of basecoat formulations. The painted laminates were then placed at identical distances beneath the heating elements of a pair of radiant quartz heaters and heated to molding temperatures of 285° F. The time/temperature plots of these two laminates are shown in FIG. 1. It is apparent that the reflective silver coated laminate heats significantly slower than the black coated film. When the heating rates of identical samples coated with an opaque strippable coating are compared, however, the curves are substantially the same.

In all examples, the choice of peel coat pigmentation will either speed up or retard the heating cycle.

Effects of a Vinyl Peelcoat on Heating Rates of Painted Amorphous Polyester Films

| COLOR | PEELCOAT | TEMPERATURE (C.) at 90 sec | |
|---|---|---|---|
| | | Top Surface | Bottom Surface |
| Silver metallic | NO | 114 | 129 |
| Black nonmetallic | NO | 162 | 190 |
| difference | | 48 | 61 |
| Silver metallic | YES | 138 | 142 |
| Black nonmetallic | YES | 151 | 157 |
| difference | | 13 | 15 |

Consequently, an advantage of the improved process for masking a carrier film with a peelable thermal attenuating material is that contrasting two tone parts of good quality can be formed without painting metal parts. This may reduce emissions and, furthermore, will require less energy because there are fewer bake cycles.

A further feature is that less handling is required and this, in turn, produces an increased throughput capacity.

The process of the present invention has been described in an illustrative manner, it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

What is claimed is:

1. In a process for molding a thermally sensitive carrier film to a relatively rigid substrate by use of thermoforming apparatus including a direct heat source the improvement comprising:

selecting a carrier film having a decorative feature therein which is thermally stable below a predetermined temperature limit and thermoformable at temperatures below the predetermined temperature limit;

covering the carrier film with a protective material having heat absorption characteristics which will preferentially heat the carrier film to be thermally formable without reaching the predetermined temperature limit;

exposing the protective covering to the heat source and attenuating heat flow from the heat source in the protective coating to control the temperature in the carrier film within a range less than the predetermined temperature limit and above the thermoforming temperature;

thermoforming the carrier film into bonded engagement with the relatively rigid substrate to form a laminated part including the carrier film and the relatively rigid substrate;

cooling the laminated part and removing the protective covering to expose the decorative aspect of the carrier film.

2. In a process for molding a thermally sensitive carrier film to a relatively rigid substrate by use of thermoforming apparatus including a direct heat source the improvement comprising:

selecting a carrier film having a decorative feature therein which is thermally stable below a predetermined temperature limit and thermoformable at temperatures below the predetermined temperature limit;

coating the carrier film with a protective material having heat absorption characteristics which will preferentially heat the carrier film to be thermally formable without reaching the predetermined temperature limit;

exposing the protective coating to the heat source and attenuating heat flow from the heat source in the protective coating to control the temperature in the carrier film within a range less than the predetermined temperature limit and above the thermoforming temperature;

thermoforming the carrier film with the protective coating thereon into bonded engagement with the relatively rigid substrate to form a laminated part including the protective coating, the carrier film and the relatively rigid substrate;

cooling the laminated part and stripping the protective coating therefrom to expose the decorative aspect of the carrier film.

3. In the method of claim 2, locating the coated carrier film below a heat lamp and applying heat thereto until the carrier film sags;

drawing the carrier film and the protective coating thereon against the relatively rigid substrate by imposing a pressure differential across the coated carrier film once it is heated to its thermoforming temperature;

and terminating the input of heat into the coated carrier film before the temperature thereof exceeds the temperature limit of the decorative aspect thereof.

4. In the method of claim 2, selecting the carrier film from polymeric material having first and second decorative aspects degradable at different temperature limits.

5. In the method of claim 4, selecting the protective coating from material which absorbs heat to prevent significant differential absorption of heat by the different decorative aspects in the carrier film and operative to control the temperature thereof below temperature limits at which they will be degraded.

6. In the method of claim 1, selecting the carrier film from polymeric materials in the group comprising polyesters, polyethers, polyvinyls, polyurethanes, polyamides, polycarbonates, polyolefins and copolymers, blends and alloys thereof.

7. In the method of claim 2, selecting the carrier film from polymeric materials including polyesters, polyethers, polyvinyls, polyurethanes, polyamides, polycarbonates, polyolefins and copolymers, blends and alloys thereof.

8. In the method of claim 7, selecting the carrier film to have first and second decorative aspects degradable at different temperatures.

9. In the method of claim 8, selecting the protective coating from material which absorbs heat to prevent significant differential absorption of heat by the different decorative aspects in the carrier film and operative to control the temperature thereof below temperature limits at which they will be degraded.

10. In a method for thermoforming a carrier film to a relatively rigid substrate by use of a direct heat source for conditioning the carrier film to a forming temperature and wherein the carrier film includes a temperature degradable decorative aspect the improvement comprising:

providing a carrier film having a glossy surface as its decorative aspect;

covering the carrier film with a thermal barrier which shields the glossy surface as the carrier film is heated by the direct heat source;

absorbing heat in the thermal barrier to prevent thermal degradation of the glossy surface while softening the carrier film for thermoforming against the relatively rigid substrate;

drawing the carrier film onto the substrate while the thermal barrier remains thereon to conform the carrier film to the shape of the substrate; and thereafter stripping the thermal barrier from the carrier film without physically degrading the glossy surface thereof.

11. In the method of claim 10, stripping the thermal barrier by washing it from the carrier film once the carrier film is thermoformed to the substrate.

12. In he method of claim 10, peeling the thermal barrier from the carrier film once it is thermoformed to the substrate.

13. In the method of claim 10, the carrier film selected from polymeric material having first and second decorative aspects degradable at different temperature limits.

14. In the method of claim 13, selecting the thermal barrier from material which absorbs heat to prevent significant differential absorption of heat by the different decorative aspects in the carrier film and operative to control the temperature thereof below temperature limits at which they will degrade.

15. In the method of claim 10, selecting the carrier film from polymeric materials including polyesters, polyethers, polyvinyls, polyurethanes, polyamides, polycarbonates, polyolefins and copolymers, blends and alloys thereof.

16. In the method of claim 10, locating the thermal barrier and carrier film below a heat lamp and applying heat thereto until the thermal barrier and carrier film are softened for thermoforming;

drawing the softened thermal barrier and carrier film against the relatively rigid substrate by application of a pressure differential thereacross;

and controlling heat input to the carrier film by absorption thereof in the thermal barrier to prevent degradation of the decorative aspect in the carrier film.

17. In the method of claim 16, selecting the carrier film from polymeric materials including polyesters, polyethers, polyvinyls, polyurethanes, polyamides, polycarbonates, polyolefins and copolymers, blends and alloys thereof.

18. In the method of claim 16, stripping the thermal barrier from the carrier film without degrading the glossy surface thereof.

* * * * *